May 17, 1960 A. ZITIN 2,937,092
FOOD PRODUCT AND METHOD OF MAKING THE SAME
Filed Aug. 26, 1958 2 Sheets-Sheet 1
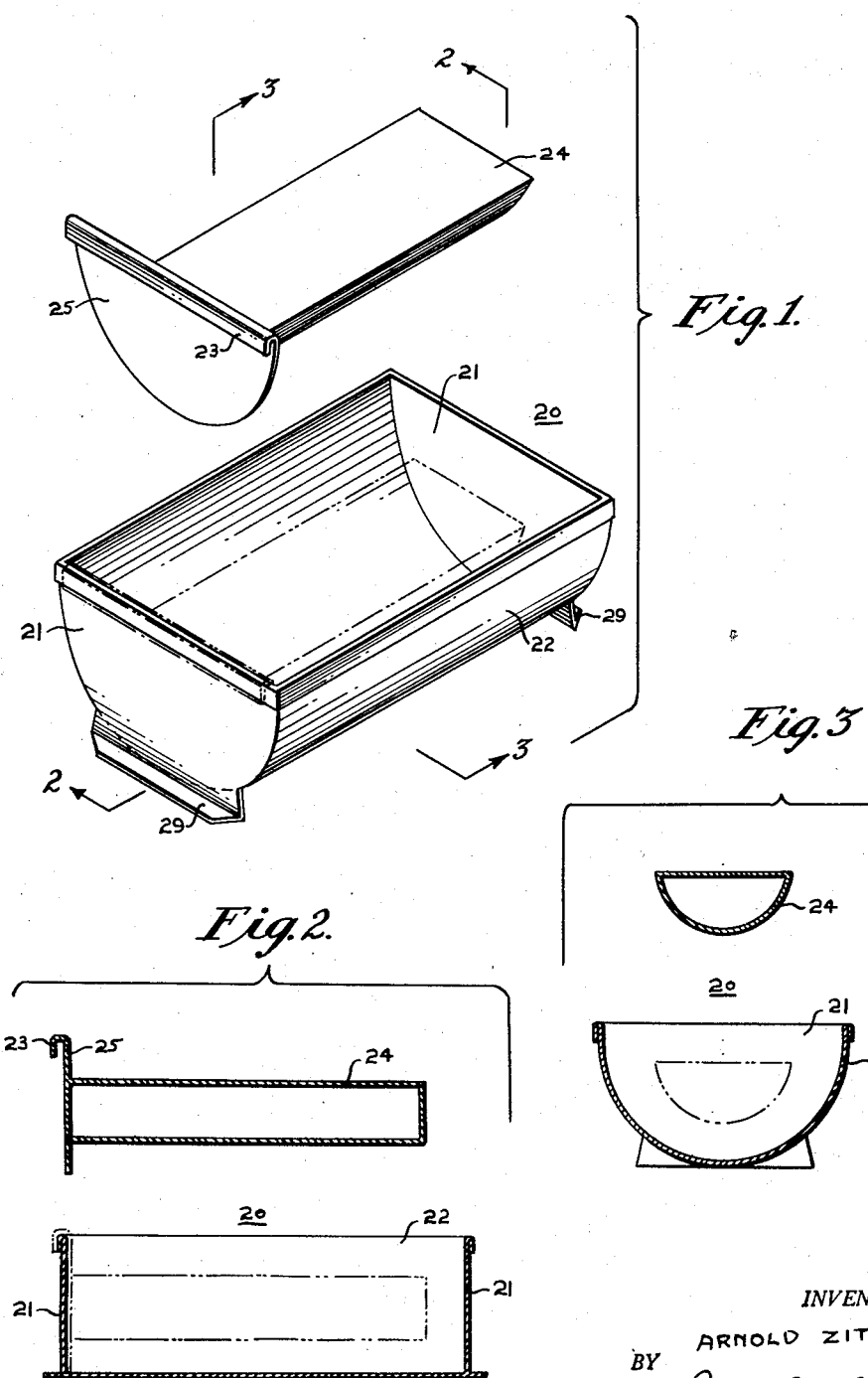
INVENTOR.
ARNOLD ZITIN
BY
*Leon Edelson*
ATTORNEY.

May 17, 1960  A. ZITIN  2,937,092
FOOD PRODUCT AND METHOD OF MAKING THE SAME
Filed Aug. 26, 1958  2 Sheets-Sheet 2

INVENTOR.
ARNOLD ZITIN
BY
ATTORNEY.

United States Patent Office 2,937,092
Patented May 17, 1960

2,937,092

FOOD PRODUCT AND METHOD OF MAKING THE SAME

Arnold Zitin, Wynnewood, Pa., assignor to Royalist Provision Company, Philadelphia, Pa., a corporation of Pennsylvania Application August 26, 1958, Serial No. 757,341

4 Claims. (Cl. 99—107)

This invention relates to the method of and apparatus for making filled meat products. More particularly, this invention relates to the method of and apparatus for making a combined meat and cheese product in which the cheese portion is completely surrounded by the meat. In the past, combination meat and cheese products have been made in which meat and cheese in the final product occupy adjacent positions to each other, but heretofore the known methods and apparatus have not been capable of producing a product in which the cheese was completely surrounded by the meat. Accordingly, it is a primary object of my invention to provide a novel method of and apparatus for making a meat-surrounded cheese product.

It is another object of my invention to provide a novel method of and apparatus for making a meat-surrounded cheese product which utilizes very simple and inexpensive apparatus.

Still another object of my invention is to provide a novel method of and apparatus for making a meat-surrounded cheese product by the use of which novel designs may be made to appear when the product is viewed in cross-section, so that the displayed product presents an interesting and attractive appearance to the purchasing consumer.

These and other objects will appear more fully hereinafter from a reading of the following specification when taken in conjunction with the several figures, wherein:

Figure 1 illustrates an exploded view of the apparatus utilized in making the novel meat and cheese product.

Figures 2 and 3 illustrate cross-sectional views of the apparatus of Figure 1, and are taken respectively along the lines 2—2 and 3—3 of that figure.

Figure 6:
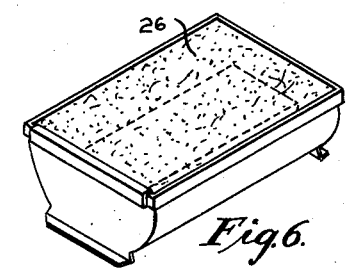
Figure 7:
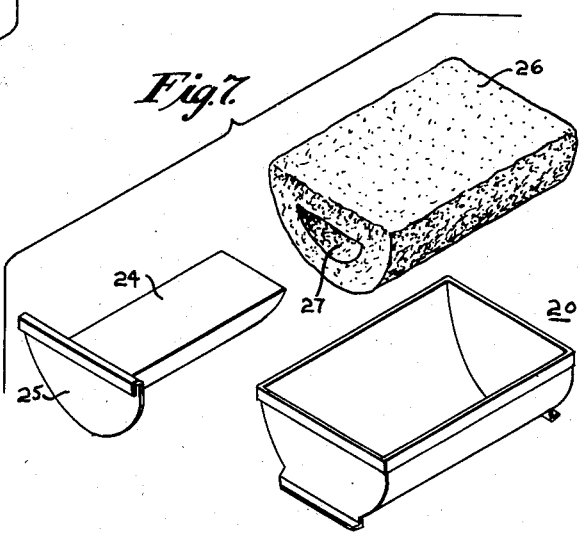
Figure 8:
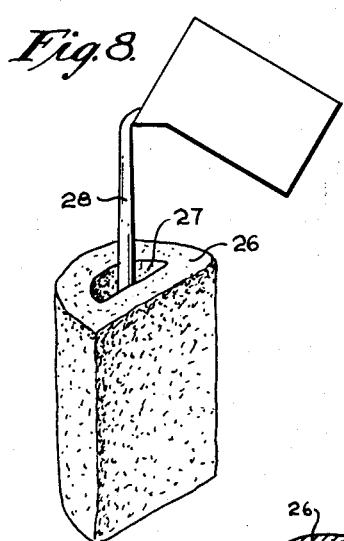

Figures 4 through 8 illustrate the successive steps of the method employed in making the product. Figures 4 through 7 illustrate the steps associated with forming a hollow meat sheathing into which the filler will be placed. Figure 8 illustrates the filling of the meat sheathing with a cheese filler to form the final product.

Figure 9:
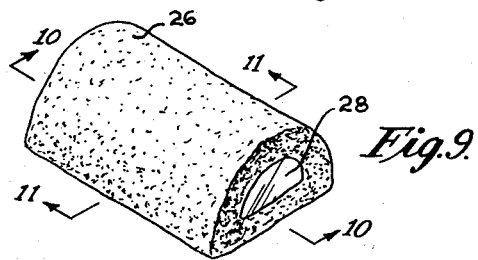

Figure 9 illustrates a perspective view of the final combined meat and cheese product.

Figure 10:
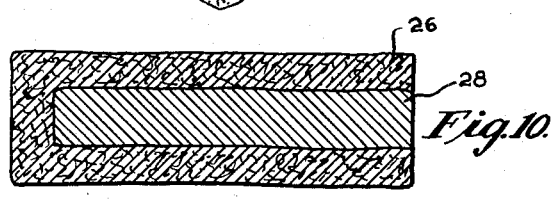
Figure 11:
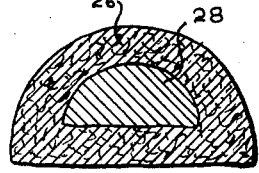

Figures 10 and 11 illustrate cross-sectional views of the combined product of Figure 9, and are taken respectively along the lines 10—10 and 11—11 of that figure.

In the several figures like elements are denoted by like reference numerals.

Referring now to Figures 1, 2 and 3, but principally to Figure 1, there is seen a two part mold consisting of a trough 20 and a form 24. The trough 20 is formed from a pair of parallel spaced end walls 21 and a semi-circular curved planar surface 22 which joins the end walls 21 together. Each of the end walls 21 includes a horizontally turned-out foot portion 29 at its base. Spaced vertically above the trough 20 is seen a closed-surface form 24 of semi-circular cross-section as viewed in Figure 3, rigidly secured to an end plate 25 having an upper downwardly lipped flange 23. The form 24 is detachably securable to the trough 20 by the flange 23 so that the form lies entirely within the trough 20. The manner of securing the form 24 to the trough 20 is illustrated in phantom in Figures 1 and 2 wherein it is seen that the flange 23 is hooked over the top of one of the end walls 21 of the trough 20 with the end plate 25 in surface bearing engagement against the inside of the same wall 21.

It will be understood, of course that molds 20 of shapes other than that illustrated may just as readily be employed in practicing the method to be described, as for example, a mold of square cross-section. Although the elongated form 24 is illustrated as being of a semi-circular shape when viewed in cross-section, other shapes may just as readily be employed, as for example circular or square or triangular configurations. Moreover, instead of using a single elongated form such as that shown as the portion 24, a plurality of spaced forms can just as readily be employed. Each of the spaced forms would of course be secured at one end to the end plate 25. The mold and form may be made of metal or any other suitable material which may be sterilized for repeated use.

Figure 4:
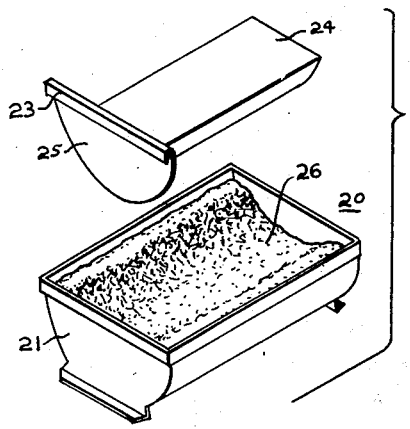
Figure 5:
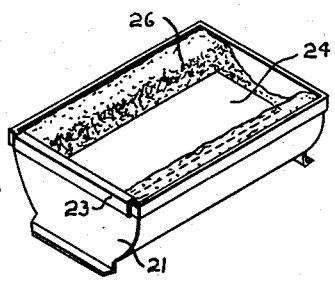

Referring now to Figures 4 through 8, in that sequence, it is seen in Figure 4 that the trough 20 has been partially filled with meat 26, as for example uncooked meat loaf, and that the form 24 is in position to be fitted into the mold. Figure 5 shows the form 24 having been placed into the mold 20 so that the flange 23 and the end plate 25 (not visible in Figure 5) are engaged with an end wall 21 in the manner previously described. The level of the meat loaf 26 is sufficiently high so that the curved surface of the form 24 must be forced down into the meat 26 in order that the flange 23 properly engages the top of the end wall 21. Upon so properly positioning the form 24 within the trough 20, the trough 20 is filled to the top with additional uncooked meat loaf thereby surrounding the form on all sides as illustrated in Figure 6.

The entire mold, and hence the meat within it, is now cooked for an appropriate length of time. After the meat has been cooked and cooled, the mold 20 is inverted on a flat surface so that the cooked meat loaf 26 may be disengaged therefrom by lifting the mold 20 upward. The form 24 is then withdrawn, thereby leaving a longitudinal semi-circular hollow opening 27 within the interior of the cooked meat. Figure 7 illustrates the cooked meat loaf 26 separated from the mold 20 and the withdrawn form 24. Withdrawal of the form 24 is readily accomplished by lubricating the surfaces thereof prior to placing the form into the mold, as for example with fat or cooking oil. Referring now to Figure 8, it is seen that the cooked meat loaf 26 has been up-ended so that the open end of the hollow longitudinally extending central opening 27 created by the withdrawal of the form 24 presents in an upward direction. Molten cheese, as 28, may be now poured into the opening 27 until it completely fills to the top. Of course although molten cheese has been described as being filled into the opening 27, and it is contemplated that in general this is the substance which will be used, there exists no reason why this filler substance must be limited to cheese. In fact any edible substance requiring no cooking after being filled into the meat may just as readily be used.

Figure 9 shows a perspective view of the final cheese filled meat loaf which may be packaged in any suitable container for refrigeration. Figures 10 and 11 are cross-sectional views taken through the loaf of Figure 9 as indicated in that figure showing clearly that the cheese is centrally positioned within the loaf and joins the meat along a sharply defined surface.

Although my invention has been described in connection with particularly illustrated apparatus for practicing the same, it will be understood of course, that such description is for illustrative purposes only and various changes and modifications may be made from time to time without departing from the general principles or real spirit thereof and it is intended to claim the same broadly as well as specifically as indicated by the appended claims.

What is claimed as new and useful is:

1. The method of making a hollow cooked meat product including the steps of, partially filling an open-topped container with meat, placing a form into the container with its under surface in contact with the meat therein and with the form top below the level of the open top of the container, one end of said form abutting one end of said container, filling the container to the top with additional meat so that the form is completely surrounded with meat, cooking the meat in the container with the form in place, removing the cooked meat and form from the container, and then withdrawing the form from the cooked meat leaving a hollow opening within the interior of the cooked meat.

2. The method of making a food product including the steps of the method of claim 1 followed by the step of completely filling the formed opening in the cooked meat with an edible substance requiring no cooking after being filled into the meat.

3. The method of making a food product including the steps of the method of claim 1 and the steps of melting a quantity of cheese, and pouring the melted cheese into the formed opening in the cooked meat so as to completely fill it.

4. A food product prepared according to the method defined in claim 2.

References Cited in the file of this patent

UNITED STATES PATENTS

| | | |
|---|---|---|
| 1,721,406 | Parsons | July 16, 1929 |
| 1,993,621 | Parsons | Mar. 5, 1935 |
| 2,027,596 | Kurz | Jan. 14, 1936 |
| 2,156,145 | Cavett et al. | Apr. 25, 1939 |
| 2,186,435 | Serr | Jan. 9, 1940 |
| 2,240,522 | Serr | May 6, 1941 |
| 2,421,199 | Gutmann | May 27, 1947 |
| 2,568,491 | Edwards | Sept. 18, 1951 |
| 2,822,571 | Johnson | Feb. 11, 1958 |